(No Model.)
J. G. DAVY.
NECKTIE FASTENER.
No. 363,212. Patented May 17, 1887.
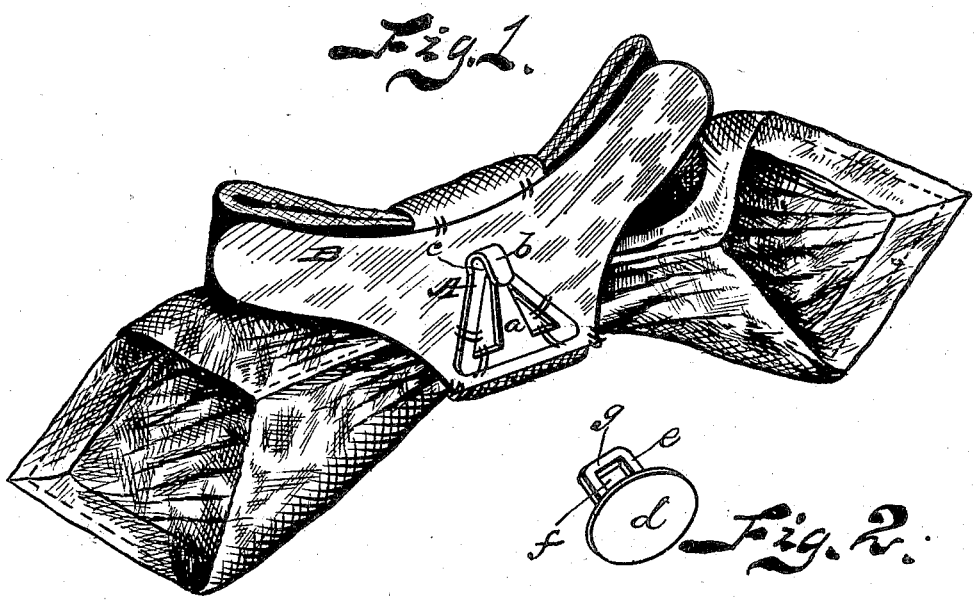
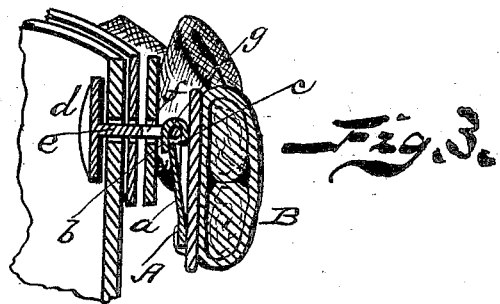
WITNESSES
Thos Moore
Frank Watson
INVENTOR
J. G. Davy
by E. H. Bates
Attorney

UNITED STATES PATENT OFFICE.

JOHN G. DAVY, OF DE KALB, ILLINOIS.

NECKTIE-FASTENER.

SPECIFICATION forming part of Letters Patent No. 363,212, dated May 17, 1887.

Application filed March 23, 1887. Serial No. 232,130. (No model.)

*To all whom it may concern:*

Be it known that I, JOHN G. DAVY, a citizen of the United States, residing at De Kalb, in the county of De Kalb and State of Illinois, have invented certain new and useful Improvements in Necktie-Retainers; and I do hereby declare the following to be a full, clear, and exact description of the invention, such as will enable others skilled in the art to which it appertains to make and use the same.

This invention relates to improvements in devices for fastening neckties to the collar of the wearer; and it consists in combining with one another a snap-hook attached to the tie, and a collar-button, composed of a single head, having a slotted shank to engage said snap when the parts are adjusted, all as will be hereinafter fully explained, and pointed out in the appended claim.

The annexed drawings, to which reference is made, fully illustrates my invention, in which—

Figure 1 represents a perspective view of my device. Fig. 2 is a perspective view of the button, and Fig. 3 is a vertical sectional view.

Referring by letter to the accompanying drawings, A designates the portion of the device which is attached to the necktie B; and it consists of an open frame or plate, which is secured to the tie, and a spring-tongue, $a$, and a hook, $b$, formed integral. The tongue, having constant pressure against the inner side of the hook, provides a space between the same and the frame, as at $c$, whereby the button is held in place. This button portion consists of a head, $d$, and a shank, $e$, which latter is provided with an opening, $f$, and closed at its end by a cross-bar, $g$, which engages the snap, whereby the two parts are coupled to one another.

It will be seen that after the button is set in position, passing the shank outwardly through the button-hole of a shirt, and then through both button-holes in the two ends of a collar, the cross-bar $g$ of the slot in the stem or shank is quickly snapped into the hook on the tie, thus connecting the two parts.

When it is desired to relieve the tie from the collar, the tongue on the tie is pressed and the bar on the shank will readily be relieved from the hook, thus separating the two parts; and it is simple in operation, can be quickly adjusted, durable, and at the same time cheap to manufacture.

What I claim is—

The combination of the tie-snap having the hook, tongue, and frame integral, and the collar-button consisting of a single head provided with the shank having the slot and cross-bar at its end, substantially as described.

In testimony whereof I affix my signature in presence of two witnesses.

JOHN G. DAVY.

Witnesses:
JOHN W. HARMON,
CHARLES H. SALISBURY.